United States Patent Office

3,816,565
Patented June 11, 1974

3,816,565
PARTICLE SIZE CONTROL OF BULK POLYMERIZED VINYL CHLORIDE POLYMERS AND COPOLYMERS
Akio Takahashi, Buffalo, N.Y., assignor to Hooker Chemical Corporation, Niagara Falls, N.Y.
No Drawing. Filed May 8, 1972, Ser. No. 251,038
Int. Cl. C08f 15/00
U.S. Cl. 260—884         3 Claims

ABSTRACT OF THE DISCLOSURE

In a process of bulk polymerization involving two-stage polymerization wherein high speed agitation is used during the first stage and slow speed agitation is used in the second stage, the polymerization in the first stage is conducted in contact with an N-vinyl pyrrolidone to produce small particle size polyvinyl chloride homopolymers or copolymers useful as extender resins in plastisols, which are used to produce protective, decorative, and adhesive coatings.

BACKGROUND OF THE INVENTION

Field of the invention

This invention relates to the production of homopolymers and copolymers of vinyl chloride having reduced grain size obtained by the bulk polymerization of the monomer or monomers by a two stage process more fully described in British Pat. 1,047,489. Such fine grain homopolymers and copolymers of 20 microns–50 microns grain size and narrow grain size distribution are useful in the preparation of plastisols and organosols for use in decorative and protective coating applications where bulk polymerized polymers were previously unsuited because of excessive grain size, irregular shape and wide grain size distribution. Heretofore, average grain sizes in the range of 80–150 microns were produced by prior art bulk polymerization and only by the more costly suspension or emulsion polymerization processes were fine grain size polymers obtainable.

Description of the prior art

According to British Pat. 1,047,489, it has been found that raising the speed of agitation during the first stage of polymerization has the effect of increasing the apparent specific gravity and contracting the distribution of grain sizes in the resin finally obtained. However, a compromise must be reached between high speed agitation during polymerization and reduction of the encrustation of the polymerization vessel during the polymerization. Thus, the process described in British 1,047,489 also involves the use of slow speed agitation which is maintained during the second stage of the polymerization process: the agitator passes close to the walls of the polymerization vessel so as to minimize encrustation of the wall with polymer.

In U.S. 3,151,103 a method is shown for reducing the particle size of a vinyl chloride homopolymer or copolymer made using bulk polymerization technique involving the use of a polymerization vessel containing freely movable indifferent bodies such as balls or rods. One of the methods used in this patent is the incorporation of a fumed silica (silicon dioxide) having a particle size of 0.015 micron which is commercially available under the trade name "Aerosil." The process disclosed provides a 40 percent higher passage through a 0.2 millimeter sieve when 1 percent by weight of fumed silica is incorporated with the vinyl chloride prior to bulk polymerization as compared to the passage through a 0.2 millimeter sieve where no fumed silica is incorporated with the monomer.

In Ser. No. 169,838, filed Aug. 6, 1971, a process is disclosed for controlling particle size in a bulk polymerization process for preparing polymers and copolymers of vinyl chloride in which the polymerization in a first stage of a two-stage bulk polymerization process is conducted in contact with an organic or inorganic inert fine particle size material solid at least at reaction temperatures and insoluble in the monomer or monomers used. In addition, particle size control can be obtained by polymerizing in contact with an anionic, cationic or non-ionic surfactant.

SUMMARY OF THE INVENTION

This invention relates to methods of obtaining small particle size homopolymers and copolymers of vinyl chloride by a bulk polymerization process involving high speed agitation during the first stage in which about 3 to about 15 percent, preferably about 7 to about 12 percent, by weight of the monomer or monomers are converted and polymerization in a second stage involving low speed agitation for the remainder of the reaction. In the process of the invention, there is incorporated as an additive in the first stage reaction, an N-vinyl pyrrolidone characterized by the following general formula:

$$\begin{array}{c} R_1-HC\underline{\phantom{xx}}C\!\!\diagup\!\!\begin{array}{c}R\\R\end{array} \\ R_1-HC\phantom{xxx}C=O \\ \diagdown N\diagup \\ | \\ CH=CH_2 \end{array}$$

wherein R and $R_1$ represent either hydrogen, methyl or ethyl groups.

It is believed critical to incorporate the additive to control particle size growth during the first stage polymerization rather than during the second stage of polymerization wherein slow speed agitation is used. By the method of the invention, small particle size polyvinyl chloride homopolymer and copolymer resins are obtained which are comparable in particle size to polymers and copolymers obtained by suspension polymerization processes for production of fine particle size polymers.

DESCRIPTION OF THE PREFERRED EMBODIMENTS

The method of the invention contemplates incorporating in a first stage polymerization of vinyl chloride 0.05 percent to about 5 percent, preferably 0.1 percent to about 1 percent, by weight, based on the monomer or monomers present of an additive to control polymer particle size having an average particle size in the range of about 10 to about 50 microns.

N-vinyl pyrrolidones are suitable as additives to control particle size. These additives are characterized by the following general formula:

$$\begin{array}{c} R_1-HC\underline{\phantom{xx}}C\!\!\diagup\!\!\begin{array}{c}R\\R\end{array} \\ R_1-HC\phantom{xxx}C=O \\ \diagdown N\diagup \\ | \\ CH=CH_2 \end{array}$$

wherein R and $R_1$ represent either hydrogen, methyl or ethyl groups.

As specific illustrations of the above N-vinyl pyrrolidones, the following may be mentioned:

N-vinyl-2-pyrrolidone
5-methyl-N-vinyl-2-pyrrolidone
5-ethyl-N-vinyl-2-pyrrolidone
3,3-dimethyl-N-vinyl-2-pyrrolidone
3-methyl-N-vinyl-2-pyrrolidone
4-methyl-N-vinyl-2-pyrrolidone
4-ethyl-N-vinyl-2-pyrrolidone.

All other conditions and measures of the method of the invention are those conventionally employed in the previously known methods for the bulk polymerization of vinyl chloride involving two-stage polymerization as disclosed in British Pat. 1,047,489 and U.S. Pat. 3,522,227, both of which are hereby incorporated by reference. In the following abbreviated description of this process, for the sake of simplicity, the initial stage of the polymerization or copolymerization will be referred to as first stage polymerization and the vessel in which this initial stage of polymerization is carried out will be referred to as a "prepolymerizer." The final or complementary stage of the polymerization will be called simply second stage polymerization and the vessel in which it is carried out the "polymerizer."

In the first stage polymerization, the means chosen to agitate the monomer or monomers is of a type capable of rotating at high speed and is commonly referred to as a "turbine type" agitator. At the start of the first stage polymerization, the vessel is charged with a monomer composition to which a catalyst has been added. Any polymerization catalyst generally used in bulk polymerization methods, that is organic peroxides such as peroxydicarbonates, and dilauroyl peroxide, benzoyl peroxide or other organic radical formers such as azo compounds in which both azo nitrogen atoms are connected with a tertiary carbon atom, and other valences of which are saturated by nitrile, carboxy, alkyl, cycloalkylene, alkyl, or alkyl-OOC radicals, or radiation rich in energy, such as ultraviolet light, can of course, also be used to an extent which is usual for bulk polymerization processes. Azo catalysts can be used such as azo-bis(isobutyronitrile), azo-bis(alpha,gamma-dimethyl valeronitrile), 2,2'-azo-bis (2,4-dimethyl valeronitrile) and azo-bis(alpha-methyl-alpha-carboxybutyronitrile). After addition of the vinyl chloride monomer to the prepolymerizer, a small amount of monomer is vented in order to blow the air out of the first stage polymerizing vessel. The speed of the turbine type agitator generally lies between 200 and 1500 revolutions per minute but these figures should not be regarded as limiting values. As soon as a conversion of at least about 3 percent of the monomer composition has been obtained in the prepolymerizer, the contents of the vessel are transferred to a polymerization vessel equipped to provide slow speed agitation so as to insure proper temperature control of the reaction medium until a final monomer conversion of about 70 percent has been achieved.

The reaction temperature in both first and second stage prepolymerization vessels ranges between about 30 degrees centigrade to about 70 degrees centigrade. The reaction pressure range is about 70 to about 200 pounds per square inch.

Examples of monomers that can be copolymerized with vinyl chloride are vinylidine chloride and vinyl esters such as vinyl acetate. The proportion of vinyl chloride should amount to at least 80 percent by weight of the monomers employed.

The optical microscope and sieve analysis were used as a method of determining average particle size. A magnification of 155 times was used together with an eye piece having a scale graduated in microns to determine the average particle size directly in microns. A 325 mesh screen having openings of 44 microns was used.

The molecular weight of the polymers presently commercially produced by bulk polymerization ranges from about 40,000 to about 125,000 by the weight average method. The ASTM method 1243 method A (1 percent in cyclohexanone) was also used to determine molecular weight by relative viscosity. The polymers produced varied by this method between 1.6 and 2.7.

Laboratory experiments were run using a 1 liter capacity glass reactor.

A great deal of laboratory work was done utilizing only a first stage polymerization reactor having high speed agitation because in small laboratory size second stage reactors, it has been difficult to obtain the uniformity of mixing which is more readily obtainable in the large plant batch equipment or in the intermediate scale equipment. Laboratory experiments were thus run in a one liter first stage reactor at low conversions, that is, between about 3 and about 15 percent and these experiments were used to predict the particle size ultimately to be obtained had these particle conversions been carried to the 70 to 75 percent conversion usually attained by using a second stage reactor.

In order to further illustrate this invention but without being limited thereto, the following examples are given. All percentages are expressed by weight and all temperatures are in degrees centigrade unless otherwise indicated.

EXAMPLE 1

Control

A polymer representative of those produced by methods of the prior art was prepared as follows:

A vertical cylindrical reactor of stainless steel of 3,000 gallons capacity provided with an agitator of the turbine type as previously described and illustrated in British Pat. 1,047,489 was charged with 13,000 pounds of vinyl chloride monomer and 0.7 pounds of acetylcyclohexanesulfonylperoxide and 1.8 pounds of di-2-ethylhexyl peroxydicarbonate. The agitator was turned on and set to revolve at 200 revolutions per minute. The temperature was raised from 20 degrees centigrade to 70 degrees centigrade and the pressure was maintained at 167 pounds per square inch. These conditions were maintained throughout the first stage of polymerization which lasted approximately ¾ hour. All other standard methods of carrying out the operation of polymerization in mass were also observed. The temperature was maintained by a flow of water through the water jacket which covered the reactor. After ¼ hour, the contents of the reactor were transferred to a second reactor having a ribbon blender type agitation, previously described and shown in British Pat. 1,047,489 for the completion of the polymerization. In this second reactor were added 5,000 pounds of vinyl chloride monomer and 1.3 pounds of acetylcyclohexanesulfonyl peroxide, together with 3.1 pounds of di-2-ethylhexyl peroxy dicarbonate prior to transfer of the contents of the first stage reactor to the second stage reactor. The pressure on the reactor was raised to 97 p.s.i.g. and the reaction continued over a period of 5 hours at 60 degrees centigrade. After a total elapsed time of 5¼ hours, the reactor was vented and all the monomer which had not polymerized was vaporized and conducted to a condenser line which includes a cyclone and a filter in order to trap the grains of polymer which were entrained by the escaping gases. The last traces of monomer which had been absorbed by the polymer were extracted by two extractions of the reactor under reduced pressure, each of which were followed by scavaging with a current of nitrogen. The discharge hatch of the reactor was then opened and the average size of the particles were determined by screen analysis or alternately examined under the microscope using 155 times magnification to determine average particle size. The polymer showed an average particle size of 120 microns by microscopic observation and a relative viscosity of 2.33.

EXAMPLE 2

In order to illustrate the correlation between laboratory preparation of polymers using only a single stage 1 liter capacity reactor at low conversion and large scale preparation using both first and second stage reactors, a formula similar in percentage to that of Example 1 was prepared in the laboratory using a 1 liter reactor equipped with high speed agitation. The first stage polymerization was conducted using a pressure of 167 p.s.i.g. over a period of 15 minutes at a temperature of 70 degrees centigrade as in the first stage of Example 1 above. A conversion of 7 percent was obtained and a particle size of 115 microns as determined by microscopic observation was obtained.

EXAMPLE 3

Into a 1 liter flask equipped to provide high speed agitation were added 10 milliliters of N-vinyl-2-pyrrolidone and 500 milliliters of vinyl chloride monomer, together with 0.06 milliliters of a 40 percent solution of di-2-ethylhexyl peroxy dicarbonate in mineral spirits, 0.15 milliliters of a 29 percent solution of acetyl cyclohexane sulfonyl peroxide in dimethyl phthalate, and 0.5 grams of 2,2'-azobis (2,4 - dimethyl valeronitrile). To remove air from the reactor, 50 grams of monomer were vented to the atmosphere. The polymerization was conducted at 60 degrees centigrade for 3 hours to obtain a conversion of 15 percent of a powdery polymer having an average particle diameter of 20 microns by optical microscope evaluation. Glass transition temperature was 57 degrees centigrade.

EXAMPLE 4

Following the procedure of Example 3, 0.44 percent of N-vinyl-2-pyrrolidone based on 500 milliliters of vinyl chloride monomer was incorporated into a one liter capacity reactor. Polymerization was conducted at 60 degrees centigrade over a period of 3 hours and at a 21.8 percent conversion was obtained of the polymer having an average particle diameter of 10 to 20 microns.

EXAMPLE 5

Following the procedure of Example 3, 0.11 percent of N-vinyl pyrrolidone was used together with 500 milliliters of vinyl cholride monomer in a one liter laboratory first stage reactor. Polymerizations were conducted at 60 degrees centigrade over a period of 3 hours and, alternately, at 60 degrees centigrade over a period of 1 hour. After 3 hours of polymerization, a conversion of 25 percent was obtained of a polymer having an average particle size of less than 20 microns. After a polymerization time of 1 hour, 7.8 percent conversion was obtained of a polymer having an average particle size of less than 20 microns.

EXAMPLE 6

(Forming no part of this invention)

Following the procedure of Example 3, 0.02 percent of N-vinyl-2-pyrrolidone was used based upon 500 milliliters of vinyl chloride monomer in a one liter laboratory reactor.

In this example, the polymerization initiators were as follows. 0.06 milliliters of a 40 percent solution of di-2-ethyl hexyl peroxy dicarbonate in mineral spirits, 0.5 milliliters of a 40 percent solution of di-2-ethyl hexyl peroxy dicarbonate in mineral spirits. Polymerization was conducted over a period of 1 hour at a temperature of 60 degrees centigrade. A conversion of 11 percent was obtained of a polymer having an average particle diameter of about 200 microns.

While it is preferred that the monomer composition be comprised totally of vinyl halide monomer, the present invention is also intended to include copolymers formed by the free-radical addition polymerization of a monomer composition containing a predominant amount, e.g., at least 50 percent of vinyl halide and a minor amount, e.g., up to 50 percent by weight of another ethylenically unsaturated monomer material copolymerizable therewith. Preferably, the other ethylenically unsaturated monomer material is used in amounts of less than 25 percent by weight and more preferably in amounts less than 10 percent by weight of the total monomer materials used in preparing the polymer. Suitable ethylenically unsaturated monomer materials which can be used to form copolymers, terpolymers, interpolymers, and the like, are illustrated by the following monoolefinic hydrocarbons, i.e., monomers containing only carbon and hydrogen, including such materials as ethylene, propylene, 3-methylbutene-1, 4-methylpentene-1, pentene-1, 3,3-dimethyl-butene-1, 4,4-dimethylbutene-1, octene-1, decene-1, styrene and its nuclear or alpha-alkyl or aryl substituted derivatives, e.g., o-, m- or p-methyl, ethyl, propyl or butyl styrene; alpha-methyl, ethyl, propyl or butyl styrene; phenyl styrene, and halogenated styrenes such as alpha-chlorostyrene; monoolefinically unsaturated esters, including vinyl esters, e.g., vinyl acetate, vinyl propionate, vinyl butyrate, vinyl stearate, vinyl benzoate, vinyl-p-chlorobenzoates; alkyl methacrylates, e.g., methyl, ethyl, propyl, and butyl methacrylate; octyl methacrylate; alkyl crotonates, e.g., octyl; alkyl acrylates, e.g., methyl, ethyl, propyl, butyl, 2-ethyl hexyl, stearyl, hydroxyethyl and tertiary butylamino acrylates, isopropenyl esters, e.g., isopropenyl acetate, isopropenyl propionate, isopropenyl butyrate and isopropenyl isobutyrate, isopropenyl halides, e.g., isopropenyl chloride; vinyl esters of halogenated acids, e.g., vinyl alpha-chloroacetate, vinyl alpha-chloropropionate and vinyl alpha-bromopropionate; allyl and methallyl esters, e.g., allyl chloride, allyl cyanide; allyl chlorocarbonate, allyl nitrate, allyl formate and allyl acetate and the corresponding methallyl compounds; esters of alkenyl alcohols, e.g., beta-ethyl allyl alcohol and beta-propyl allyl alcohol; halo-alkyl acrylates, e.g., methyl alpha-chloroacrylate, and ethyl alpha-chloroacrylate, alpha-bromoacrylate, ethyl alpha-bromoacrylate, methyl alpha-fluoroacrylate, ethyl alpha-fluoroacrylate, methyl alpha-iodoacrylate and ethyl alpha-iodoacrylate; alkyl alpha-cyanoacrylates, e.g., methyl alpha-cyanoacrylate and ethyl alpha-cyanoacrylate; maleates, e.g., monomethyl maleate, monoethyl maleate, dimethyl maleate, diethyl maleate; and fumarates, e.g., monomethyl fumarate, monoethyl fumarate, dimethyl fumarate, diethyl fumarate; and diethyl glutaconate; monoolefinically unsaturated organic nitriles including, for example, fumaronitrile, acrylonitrile, methacrylonitriles, ethacrylonitrile, 1,1-dicyanopropene-1,3-octenenitrile, crotonitrile and oleonitrile; monoolefinically unsaturated carboxylic acids including, for example, acrylic acid, methacrylic acid, crotonic acid, 3-butenoic acid, cinnamic acid, maleic, fumaric and itaconic acids, maleic anhydride and the like. Amides of these acids, such as acrylamide, are also useful. Vinyl alkyl ethers and vinyl ethers, e.g., vinyl methyl ether, vinyl ethyl ether, vinyl propyl ether, vinyl-n-butyl ether, vinyl isobutyl ether, vinyl 2-ethyl hexyl ether, vinyl 2-chloroethyl ether, vinyl cetyl ether and the like; and vinyl sulfides, e.g., vinyl $\beta$-chloroethyl sulfide, vinyl $\beta$-ethoxyethyl sulfide and the like, can also be included. Diolefinically unsaturated hydrocarbons containing two olefinic groups in conjugated relation and the halogen derivatives thereof, e.g., butadiene-1,3; 2-methyl-butadiene-1,3; 2,3-dimethylbutadiene-1,3; 2-chlorobutadiene-1,3; 2,3-dichlorobutadiene-1,3; and 2-bromobutadiene-1,3 and the like.

Specific monomer compositions for forming copolymers can be illustrated by vinyl chloride and/or vinylidene chloride and vinyl acetate, vinyl chloride and/or vinylidene chloride and maleic or fumaric acid esters, vinyl chloride and/or vinylidene chloride and acrylate or methacrylate ester, vinyl chloride and/or vinylidene chloride and vinyl alkyl ether. These are given as illustrative of the numerous combinations of monomers possible for the formation of copolymers. The present invention is intended to cover all such combinations which fall within the scope of the present invention. While these combinations are intended to be included within the scope of the present invention, it is preferred that the polymer be formed from pure vinyl halide monomer and most preferably pure vinyl chloride.

While this invention has been described with reference to certain specific embodiments, it will be recognized by those skilled in the art that many variations are possible without departing from the scope and spirit of the invention.

What is claimed is:

1. In a process for the preparation of polymers and copolymers of vinyl halide by bulk homopolymerization or copolymerization of a monomer or monomers wherein polymerization is carried out in a first stage during which a reaction mixture is subjected to high speed agitation until about 3 percent to about 15 percent of said monomer or monomers have been converted to polymer and in which said polymerization is completed in a second stage during which said reaction mixture is subjected to low speed agitation until the reaction has been completed, the improvement which comprises carrying out said polymerization of said monomer or monomers in said first stage, together with a compound consisting of an N-vinyl pyrrolidone of the formula:

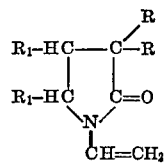

wherein R and $R_1$ are individually selected from hydrogen, methyl or ethyl groups and wherein said compound is present in a proportion of about 0.05 to about 5 percent by weight based upon said monomer or monomers.

2. The product of the process of claim 1.
3. The product of the process of claim 1 wherein said N-vinyl pyrrolidone is N-vinyl-2-pyrrolidone.

References Cited
UNITED STATES PATENTS 2,958,614   11/1960   Perry _____ 260—87.5 E
3,562,237   2/1971    Thomas _____ 260—92.8 R JOSEPH L. SCHOFER, Primary Examiner
A. HOLLER, Assistant Examiner U.S. Cl. X.R.
260—87.5 E, 92.8 R